US012698057B2

(12) United States Patent
    Oswell

(10) Patent No.: US 12,698,057 B2
(45) Date of Patent: Aug. 4, 2026

(54) TELESCOPIC BOAT HELM SYSTEM

(71) Applicant: ROSWELL CANADA INC., Acheson (CA)

(72) Inventor: Robert E. Oswell, Merritt Island, FL (US)

(73) Assignee: ROSWELL CANADA INC., Acheson (CA)

( * ) Notice: Subject to any disclaimer, the term of this patent is extended or adjusted under 35 U.S.C. 154(b) by 777 days.

(21) Appl. No.: 17/937,856

(22) Filed: Oct. 4, 2022

(65) Prior Publication Data

US 2023/0115398 A1    Apr. 13, 2023

Related U.S. Application Data

(60) Provisional application No. 63/255,157, filed on Oct. 13, 2021.

(51) Int. Cl.
    B63B 17/00     (2006.01)
    B60N 2/16      (2006.01)
    B63H 21/21     (2006.01)
    B63H 25/02     (2006.01)
    *B63B 29/04*      (2006.01)

(52) U.S. Cl.
    CPC .............. B63B 17/00 (2013.01); B60N 2/16 (2013.01); B63H 21/21 (2013.01); B63H 25/02 (2013.01); *B63B 2017/0054* (2013.01); *B63B 2029/043* (2013.01); *B63H 2025/022* (2013.01)

(58) Field of Classification Search
    CPC .............. B63B 17/00; B63B 2029/043; B63B 2029/046; B63H 21/21; B63H 21/213;

B63H 2021/216; B63H 21/22; B63H 25/02; B63H 2025/022; B63H 2025/024; B63H 2025/026; B63H 2025/028; B60K 2026/024

See application file for complete search history.

(56) References Cited

U.S. PATENT DOCUMENTS

| | | | |
|---|---|---|---|
| 2,384,981 A | 9/1945 | Wallace | |
| 2,630,187 A | 3/1953 | Di Loreta | |
| 3,448,821 A | 6/1969 | Mcguire | |
| 3,736,897 A * | 6/1973 | Krutz ..................... B63B 29/04 | |
| | | | 114/363 |
| 4,299,407 A | 11/1981 | Simson | |
| 4,392,546 A | 7/1983 | Brown et al. | |
| 4,580,647 A | 4/1986 | Peifer et al. | |
| 4,733,745 A | 3/1988 | Lumpkins | |
| 4,821,837 A | 4/1989 | Fifer | |
| 4,909,095 A | 3/1990 | Carlson | |
| 5,261,502 A | 11/1993 | Kronholm, Jr. | |
| 5,632,353 A | 5/1997 | Kimberley | |

(Continued)

FOREIGN PATENT DOCUMENTS

IT        BO20120535 A1 *    4/2014    .............. B62D 1/18

*Primary Examiner* — Andrew Polay
(74) *Attorney, Agent, or Firm* — Timothy H. Van Dyke; Wolter Van Dyke Davis, PLLC

(57)            ABSTRACT

A boat station (100), including: a console shell (104) configured to be secured to a boat; and a console panel (106) configured to receive a helm control (120) and a throttle control (122) and to move relative to the console shell. The boat station is configured to adjust a vertical position of the helm control and the throttle control by moving the console panel relative to the console shell.

19 Claims, 12 Drawing Sheets

(56)  References Cited

U.S. PATENT DOCUMENTS

| | | | |
|---|---|---|---|
| 5,943,979 | A | 8/1999 | Hattori |
| 6,186,547 | B1 | 2/2001 | Skabrond et al. |
| 6,729,647 | B2 | 5/2004 | Shapiro et al. |
| 6,834,606 | B2 | 12/2004 | Berret |
| 7,490,571 | B2 | 2/2009 | Luxford |
| 8,037,781 | B2 | 10/2011 | Curtin et al. |
| 8,483,914 | B2 | 7/2013 | Copeland et al. |
| 8,656,852 | B1 | 2/2014 | Jones et al. |
| 8,943,987 | B2 | 2/2015 | Jones et al. |
| 9,302,779 | B2 | 4/2016 | Zaneboni et al. |
| 10,556,645 | B1 * | 2/2020 | Levin ...................... B63B 29/04 |
| 2006/0042857 | A1 | 3/2006 | Cotton et al. |
| 2007/0013181 | A1 | 1/2007 | Heck |
| 2010/0300796 | A1 | 12/2010 | Ryan et al. |
| 2018/0079469 | A1 | 3/2018 | Deurr et al. |
| 2021/0316821 | A1 * | 10/2021 | Hutchins ................ B63H 25/52 |
| 2022/0009591 | A1 * | 1/2022 | Price ...................... F16M 11/10 |

* cited by examiner

TELESCOPIC BOAT HELM SYSTEM

FIELD OF THE INVENTION

The invention relates to a boat station for nautical vessels.

BACKGROUND OF THE INVENTION

A boat captain controls a boat in diverse situations and may do so in standing or sitting positions. In addition, captains differ in height. Existing boat seating may provide some adjustability, but there is room for improvement.

BRIEF DESCRIPTION OF THE DRAWINGS

The invention is explained in the following description in view of the drawings that show.

DETAILED DESCRIPTION OF THE INVENTION

Figure 1:
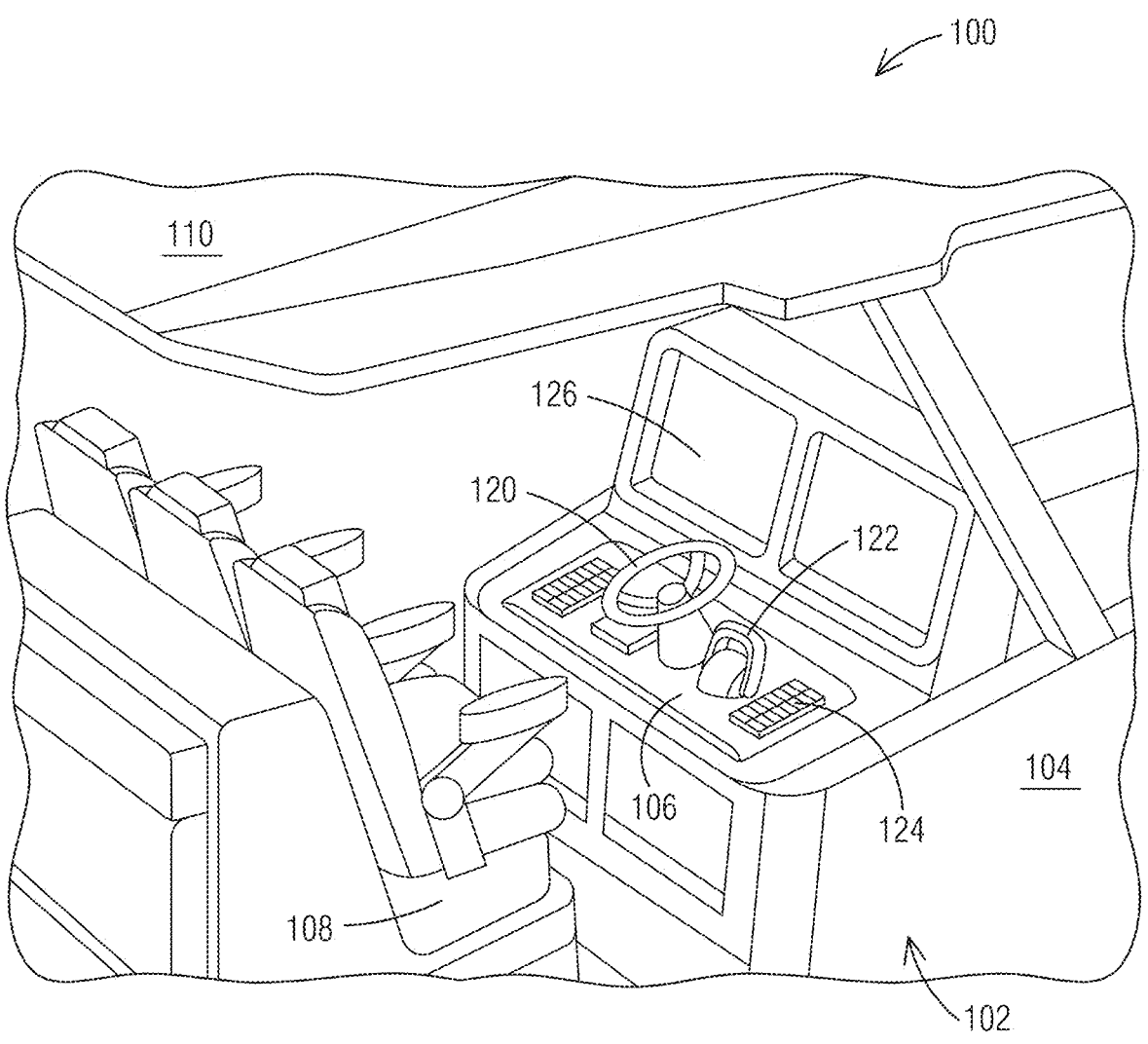
FIG. 1 shows an example embodiment of a boat station with an example embodiment of an adjustable console panel in a lower position.

The present inventor has devised a unique and innovative boat station that provides a greater range of positions from which a boat caption can operate a boat. Specifically, the boat station provides adjustability for the location of the helm control, throttle control, and optionally other boat controls so that the boat controls can be properly located relative to the captain throughout a variety of operating positions. FIG. 1 shows an example embodiment of a boat station 100 with an example embodiment of a center console 102 having a console shell 104, a console panel 106 in a lower position (e.g., a lowest position), a helm seat 108, and a hard top 110. Boat controls such as a helm control 120, throttle controls 122, and other boat controls 124 (e.g., trim tabs etc.) are disposed on the console panel 106. Other equipment boat controls 126 (e.g., screens etc.) may be disposed in the console shell 104 and/or the hard top 110. The console panel 106 is that structure to which the boat controls directly mount. In an example embodiment, the boat station may include or be a helm station.

Figure 2:
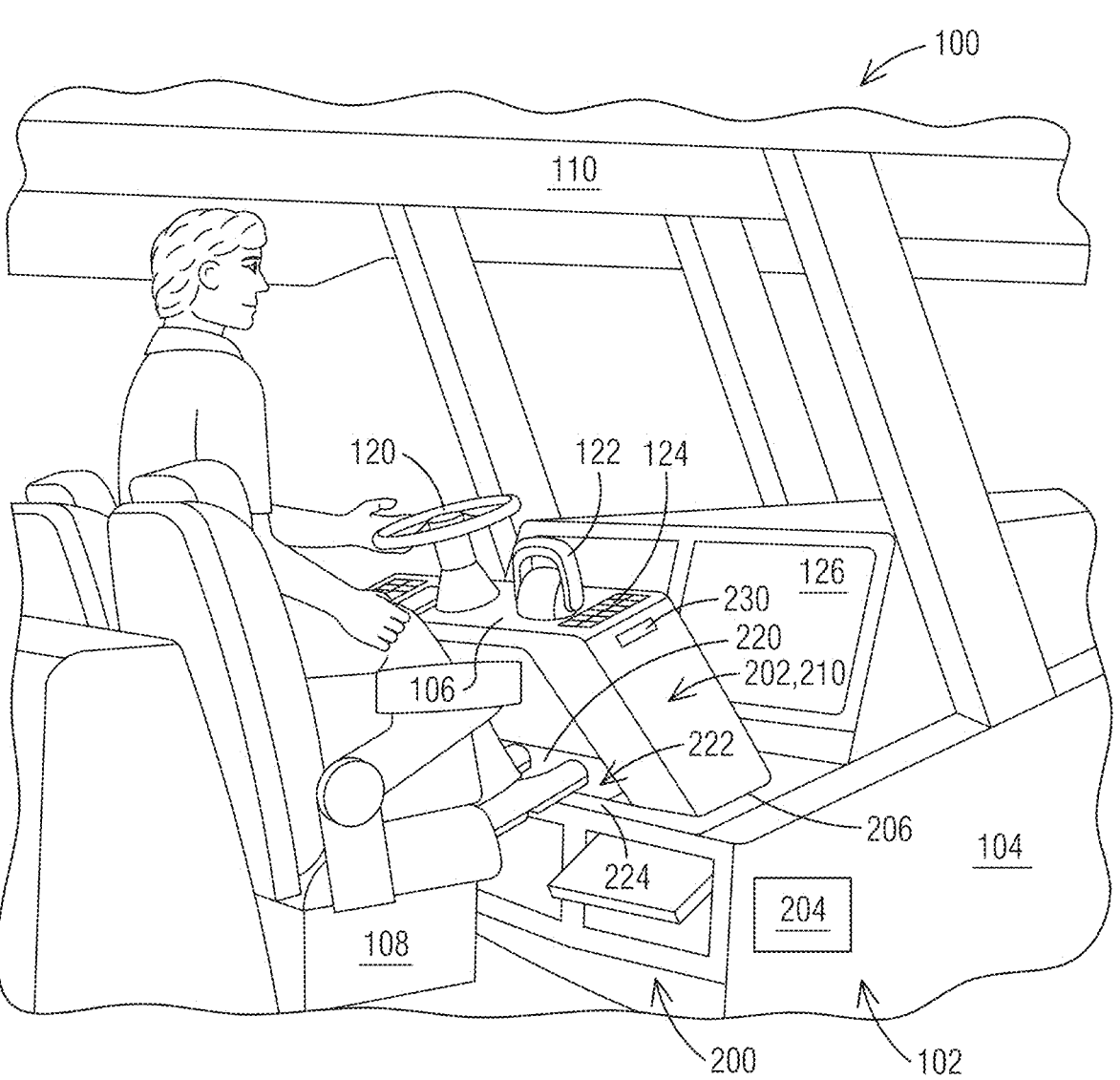
FIG. 2 shows the boat station of FIG. 1 with the adjustable console panel in an upper position.

FIG. 2 shows the boat station 100 with the console panel 106 in an upper position. In the upper position, (e.g., an uppermost position), the console panel 106 is raised vertically relative to the console shell 104 and also moved rearward toward the helm seat 108. This permits a captain seated in a relatively high position in the helm seat 108 comfortable access to the helm control 120, the throttle control 122, and optionally other boat controls 124 without having to lean over to reach them. In an example embodiment, some boat controls are not elevated with the console panel 106. Adjustment of the console panel 106 is achieved using a position adjusting assembly 200 that includes an adjustable extension component 202 that is secured to the console panel 106 and an actuator 204 connected to the adjustable extension component 202. The actuator 204 may extend the adjustable extension component 202 through an opening 206 in the console shell 104. The actuator 204 may be manual (e.g., a crank) or powered (e.g., hydraulic, or electrical, such as 12 volt or 24 volt). A manual actuator may or may not include a gas or spring assist. Any actuator known to the artisan may be used, such as telescopic, rack and pinion, and/or screw etc. A powered actuator may be activated using a conventional switch to drive the adjustable extension component 202 up or down as desired. There may be one actuator or more than one actuator. A single actuator may be centrally positioned relative to the console panel 106 or positioned closer to an edge of the console panel 106. Alternately, there may be two or more actuators, each positioned, for example, at a respective end of the console panel 106.

In an example embodiment, the actuator 204 may include a telescoping assembly secured to the adjustable extension component 202 and a motive component (such as a piston, a motor, or the like). The telescoping assembly may include two or more members longitudinally moveable relative to one another for moving the adjustable extension component 202 between the lower position and the upper position. A first member of the two or more members is at least partially hollow such that the first member defines a channel. A second member of the two or more members may be at least partially disposed in the channel. The motive component may be disposed within or adjacent the two or more members and drive one member relative to the other member to create the telescoping action. Such a telescoping assembly is disclosed in U.S. patent application Ser. No. 16/540,770 published as US Publication number 2020/0055576, entitled "Telescoping Tower for a Boat", filed on Aug. 14, 2019, which is incorporated in its entirety herein.

The adjustable extension component 202 may be plastic, composite, or aluminum and the like, and may be cast, machined, and/or assembled. In the example embodiment shown in FIG. 2, the adjustable extension component 202 spans an entire perimeter of the panel opening 206 in the console shell 104 through which the adjustable extension component 202 passes. This forms a safety skirt 210 that blocks operator access into the panel opening 206.

In the example embodiment shown in FIG. 2, the position adjusting assembly 200 includes an adjustable footrest surface 220 below the console panel 106 that is configured to move with the console panel 106. The adjustable footrest surface 220 provides a footrest 222 when the console panel 106 is in the upper position. In an example embodiment, when the console panel 106 is in the upper position, the adjustable footrest surface 220 aligns with a shell footrest surface 224 of the console shell 104 to collectively form the footrest 222.

In the example embodiment shown in FIG. 2, the boat station 100 includes a light 230 configured to move with the console panel 106. When the console panel 106 is in the console panel upper position, the light is directed toward the console shell 104.

Figure 3:
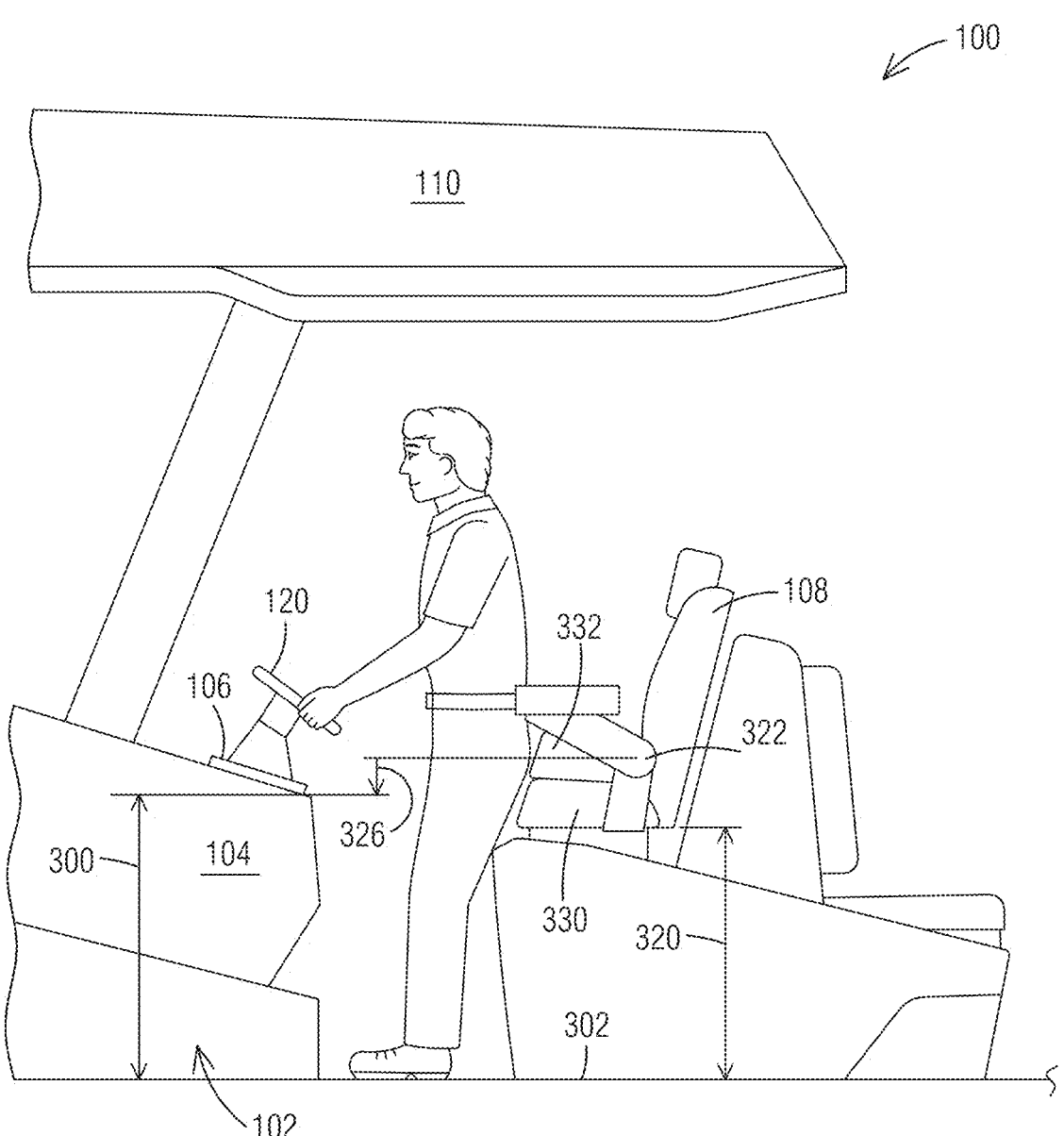
FIG. 3 shows the boat station of FIG. 1 with the adjustable console panel in the lower position and an example embodiment of a seat in a lower position.
Figure 4:
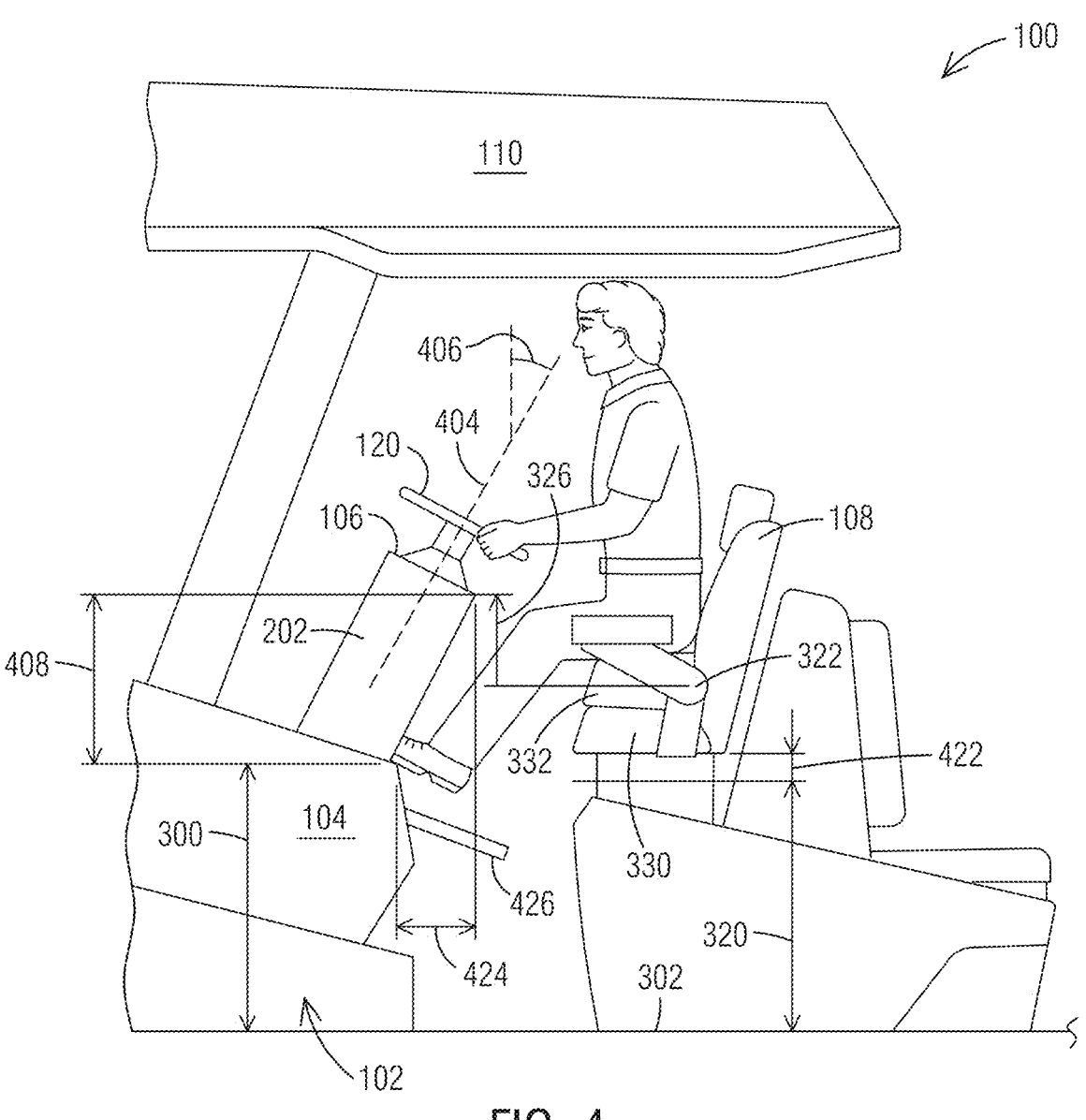
FIG. 4 shows the boat station of FIG. 1 with the adjustable console panel in the upper position and the seat in the upper position.

FIG. 3 and FIG. 4 are side views of the boat station 100 of FIG. 1. In FIG. 3 the console panel 106 is in a console panel lower position (e.g., a lowest position), while in FIG. 4 the console panel 106 is in a console panel upper position (e.g., an uppermost position). The helm seat 108 is vertically adjustable and is shown in FIG. 3 in a helm seat lower position (e.g., a lowest position), and in FIG. 4 in a helm seat upper position (e.g., an uppermost position).

When in the console panel lower position, the console panel 106 is disposed a distance 300 (e.g., thirty (30) inches, +/−four (4) inches) above a deck 302 in front of the helm control 120 on which the captain may stand. The console panel 106 extends from the console shell 104 via the adjustable extension component 202 along a direction of travel 404. The direction of travel 404 forms an angle 406 from zero to twenty (20) degrees from vertical. In an example embodiment, the console panel 106 elevates a vertical position of the helm control 120 et al. by a distance 408 of up to twenty-four (24) inches.

Likewise, when in the helm seat lower position, the helm seat 108 is disposed a distance 320 (e.g., thirty (30) inches, +/−four (4) inches) above the deck 302. A vertical position of the helm seat 108 adjusts by a distance 422.

In an example embodiment, the vertical distance 408 traversable by the console panel 106 is greater than a vertical distance 422 traversable by the helm seat 108. In an example embodiment, the vertical distance 408 traversable by the console panel 106 is at least eight (8) inches greater than the vertical distance 422 traversable by the helm seat 108. This greater vertical distance accommodates a full range of positions of a captain sitting on a main pad 330 of the helm seat 108 while allowing for variations in sizes of captains. The greater vertical distance also accommodates a bolster height added to the upper end of the range of positions when the captain uses an optional seat bolster 332. In addition, the greater vertical distance may accommodate one or more positions outside the range of positions of the helm seat 108. An example of a position outside the range of positions of the helm seat 108 includes one in which the captain stands on the deck 302 when that places the captain lower than is possible when the captain is seated in the helm seat 108.

In an embodiment, when the console panel 106 is in the console panel lower position and the helm seat 108 is in the helm seat lower position, the console panel 106 is lower relative to the helm seat 108 than when the console panel 106 is in the console panel upper position and the helm seat 108 is in the helm seat upper position. This can be seen by the position of the console panel 106 relative to a reference point 322 (e.g., armrest hinge). When the console panel 106 is in the console panel lower position and the helm seat 108 is also in the helm seat lower position, arrow 326 points down. In contrast, when the console panel 106 is in the console panel upper position and the helm seat 108 is in the helm seat upper position, arrow 326 points up. Such an arrangement may accommodate a captain who, while standing on the deck 302, is lower than is possible when the captain is seated in the helm seat 108.

The angle 406 of the direction of travel 404 also allows the console panel 106 to traverse a horizontal distance 424. In an example embodiment the horizontal distance 424 is up to five (5) inches, +/−two (2) inches, dependent on angle 406. This adjustment of the console panel 106 toward the helm seat 108 may accommodate a horizontal change in location between a captain who is standing on the deck 302, which is typically associated with a console panel 106 in the console panel lower position, and a captain who is seated in the helm seat 108 when the helm seat 108 is in an elevated position or in the helm seat upper position, which is typically associated with a console panel 106 in a console panel elevated position or in the console panel upper position respectively.

In an example embodiment, the console shell 104 includes one or more additional fold-out footrests 426 configured for use by a person sitting the helm seat 108 when the helm seat 108 is in the helm seat upper position.

Figure 5:
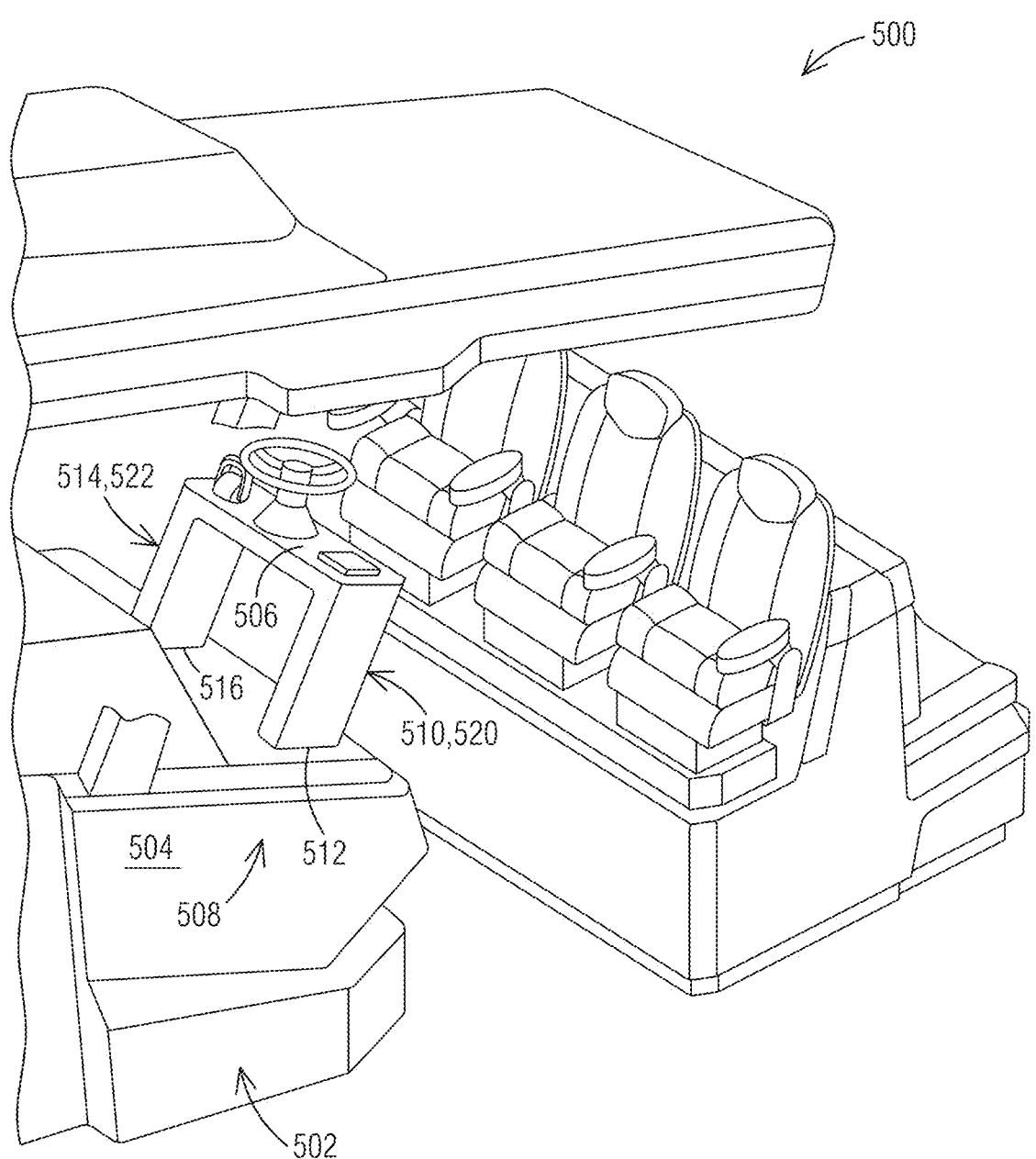
FIG. 5 shows an alternate example embodiment of a boat station with an alternate example embodiment of the adjustable console panel in the upper position.
Figure 6:
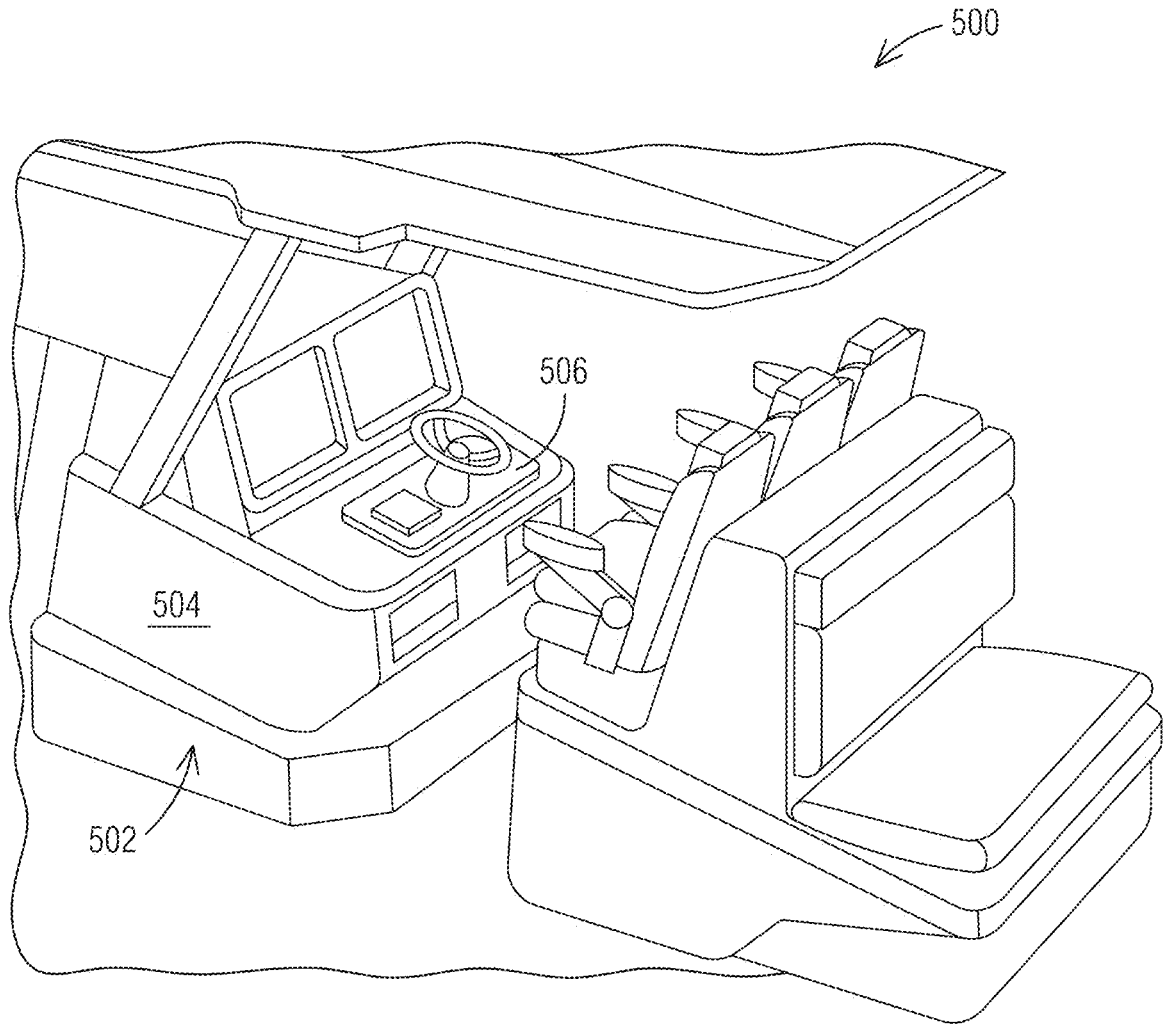
FIG. 6 shows the boat station of FIG. 5 with the adjustable console panel in the lowered position.

FIG. 5 shows an alternate example embodiment of a boat station 500 with a center console 502 having a console shell 504 and an adjustable console panel 506 in the console panel upper position. FIG. 6 shows the adjustable console panel 506 of FIG. 5 in the console panel lower position. In this example embodiment, the position adjusting assembly 508 includes a first adjustable extension component 510 secured to the console panel 506 and configured to adjustably extend from the console shell 504 through a first opening 512, and a second adjustable extension component 514 secured to the console panel 506 through a second opening 516 and configured to adjustably extend from the console shell 504. The first adjustable extension component 510 spans the entire perimeter of the first panel opening 512 in the console shell 504 through which the first adjustable extension component 510 passes. This forms a safety skirt 520 that blocks operator access into the first panel opening 512. The second adjustable extension component 514 spans the entire perimeter of the second panel opening 516 in the console shell 504 through which the second adjustable extension component 514 passes. This forms a safety skirt 522 that blocks operator access into the second panel opening 516. In this example embodiment, the console panel 506 is a relatively flat panel secured to the ends of the first adjustable extension component 510 and the second adjustable extension component 514.

Figure 7:
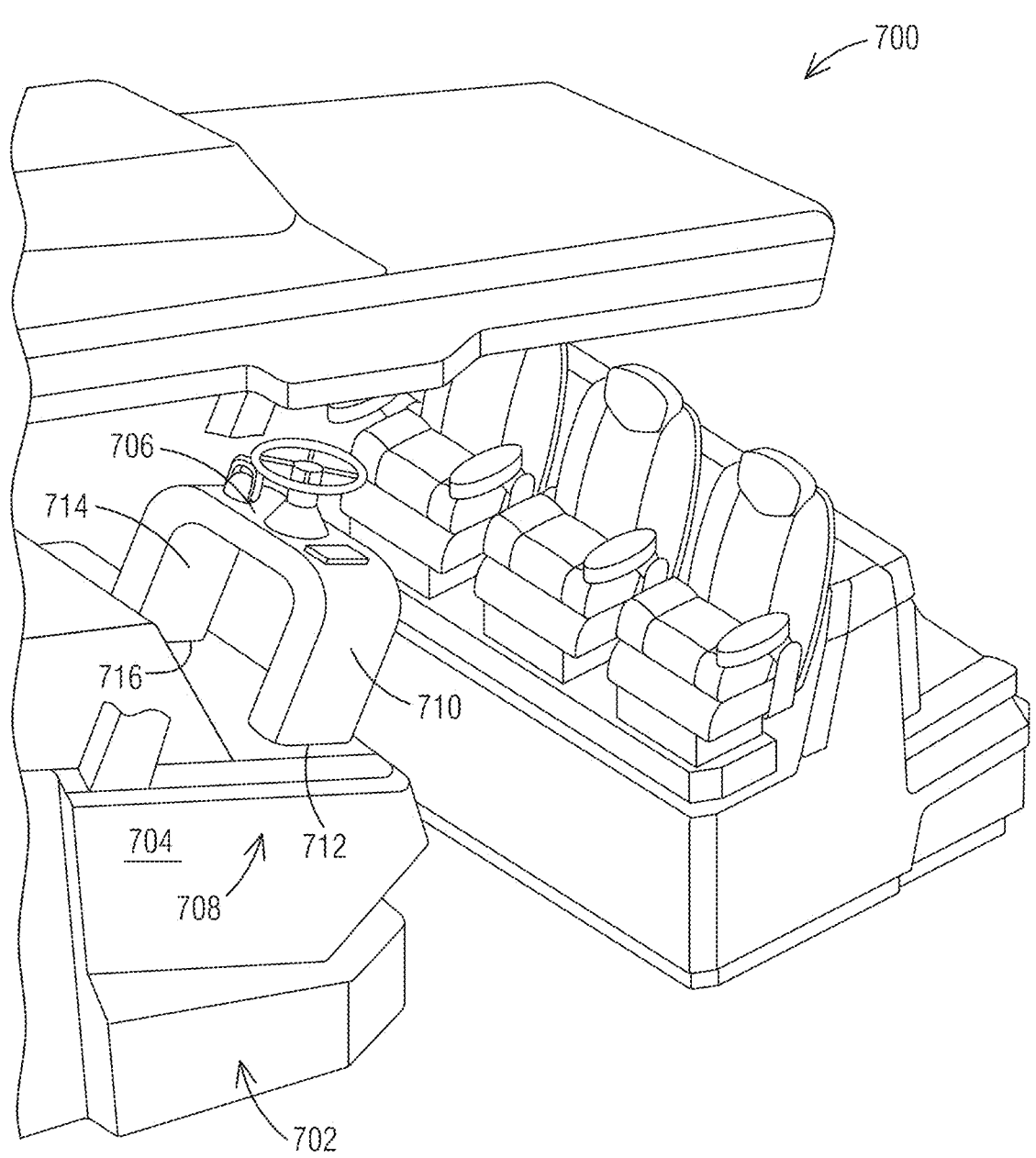
FIG. 7 shows an alternate example embodiment of the boat station with an alternate example embodiment of the adjustable console panel in the upper position.

FIG. 7 shows an alternate example embodiment of a boat station 700 with a center console 702 having a console shell 704 and an adjustable console panel 706 in the console panel upper position. In this example embodiment, the position adjusting assembly 708 includes a first adjustable extension component 710 secured to the console panel 706 and configured to adjustably extend from the console shell 704 through a first opening 712, and a second adjustable extension component 714 secured to the console panel 706 through a second opening 716 and configured to adjustably extend from the console shell 704. The first adjustable extension component 710 and the second adjustable extension component 714 form safety skirts similar to those disclosed above. In this example embodiment, the console panel 706 is secured to ends of the first adjustable extension component 710 and the second adjustable extension component 714 and these components together form a more curved structure.

Figure 8:
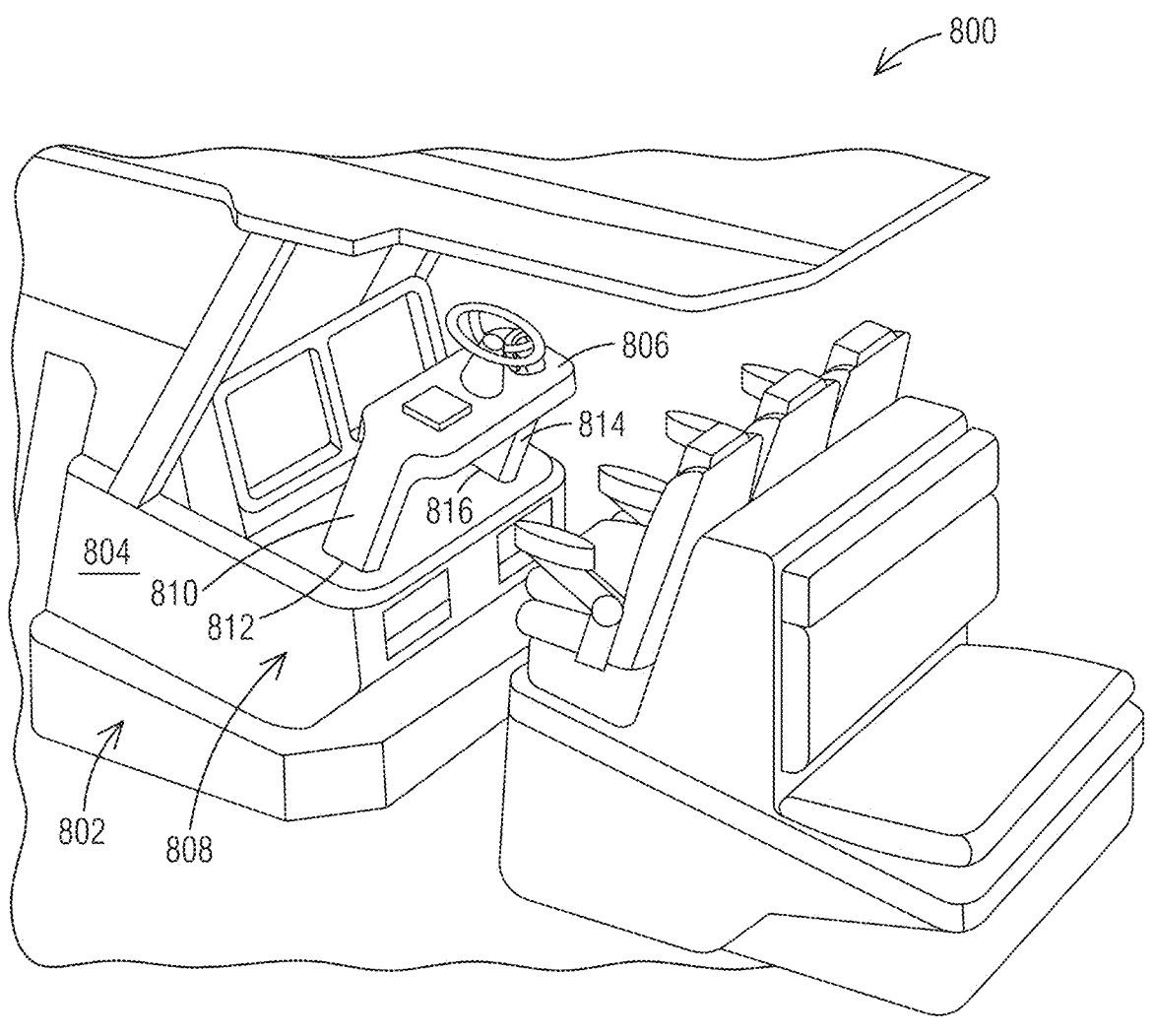
FIG. 8 shows an alternate example embodiment of the boat station with an alternate example embodiment of the adjustable console panel in the upper position.

FIG. 8 shows an alternate example embodiment of a boat station 800 with a center console 802 having a console shell 804 and an adjustable console panel 806 in the console panel upper position. In this example embodiment, the position adjusting assembly 808 includes a first adjustable extension component 810 secured to the console panel 806 and configured to adjustably extend from the console shell 804 through a first opening 812, and a second adjustable extension component 814 secured to the console panel 806 through a second opening 816 and configured to adjustably extend from the console shell 804. The first adjustable extension component 810 and the second adjustable extension component 814 form safety skirts similar to those disclosed above. In this example embodiment, the console panel 806 is secured to ends of the first adjustable extension component 810 and the second adjustable extension component 814 and these components together form a more curved structure.

Figure 9:
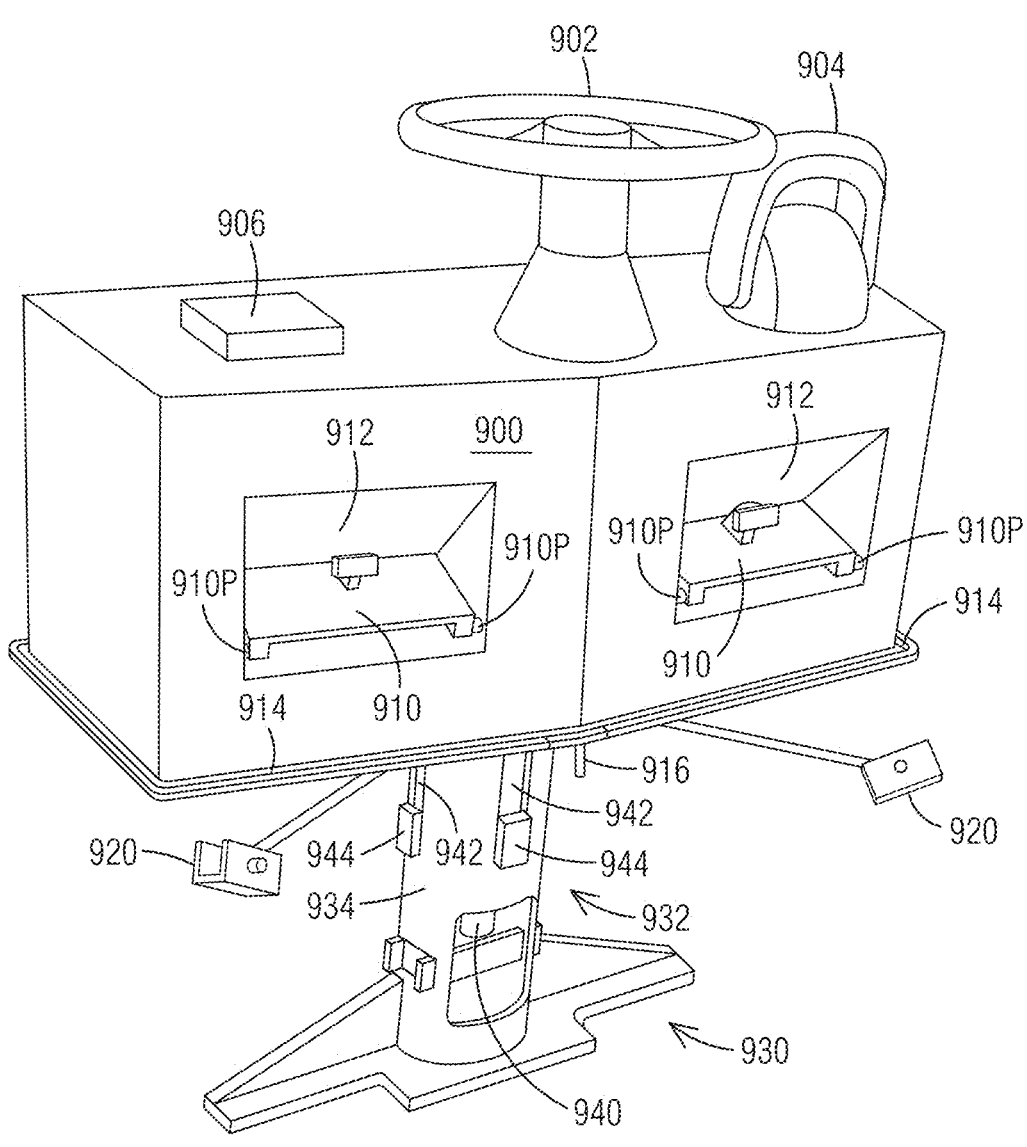
FIG. 9 to FIG. 10 show an alternate example embodiment of the adjustable console panel in the lower position.
Figure 10:
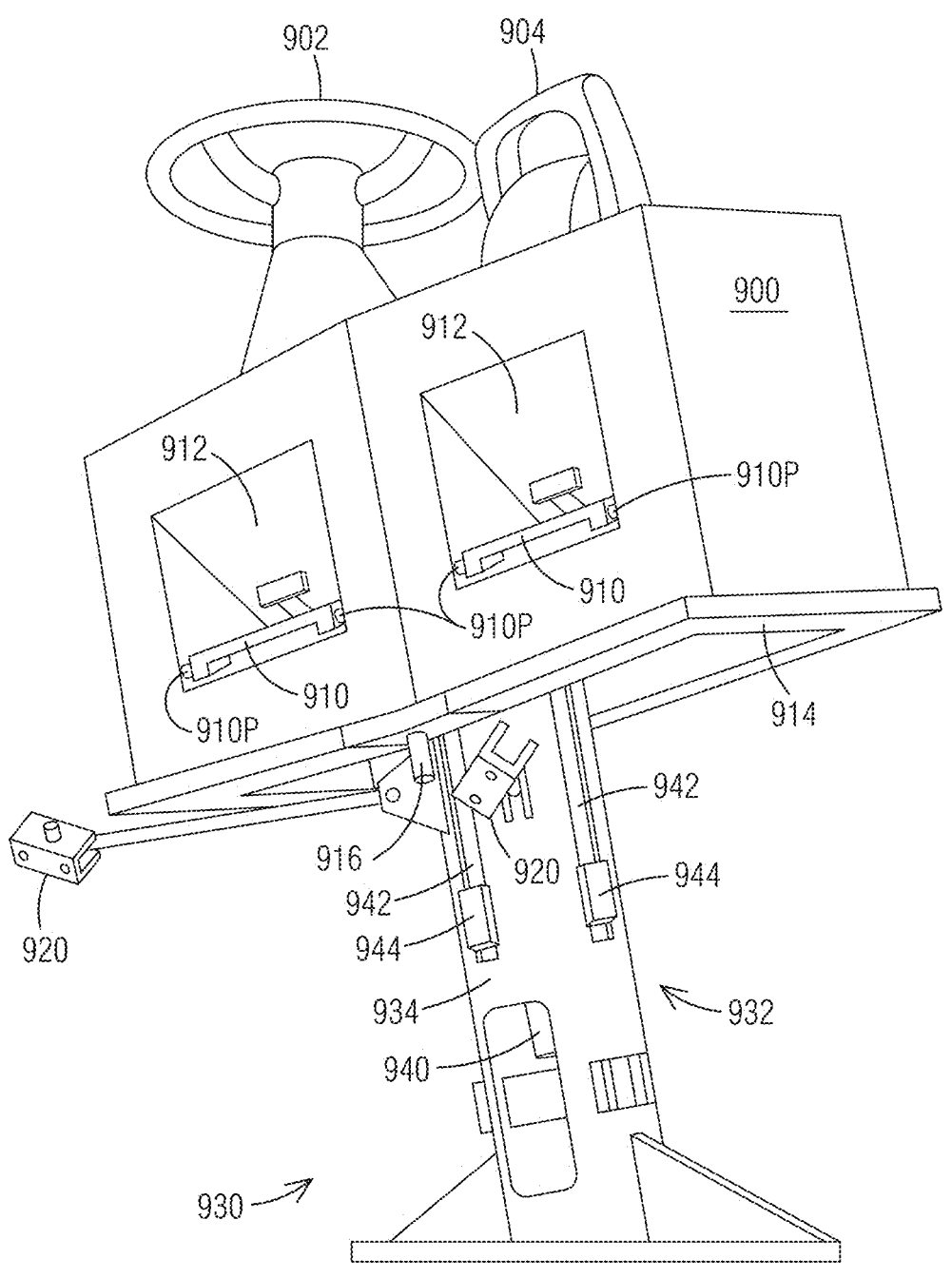
Figure 11:
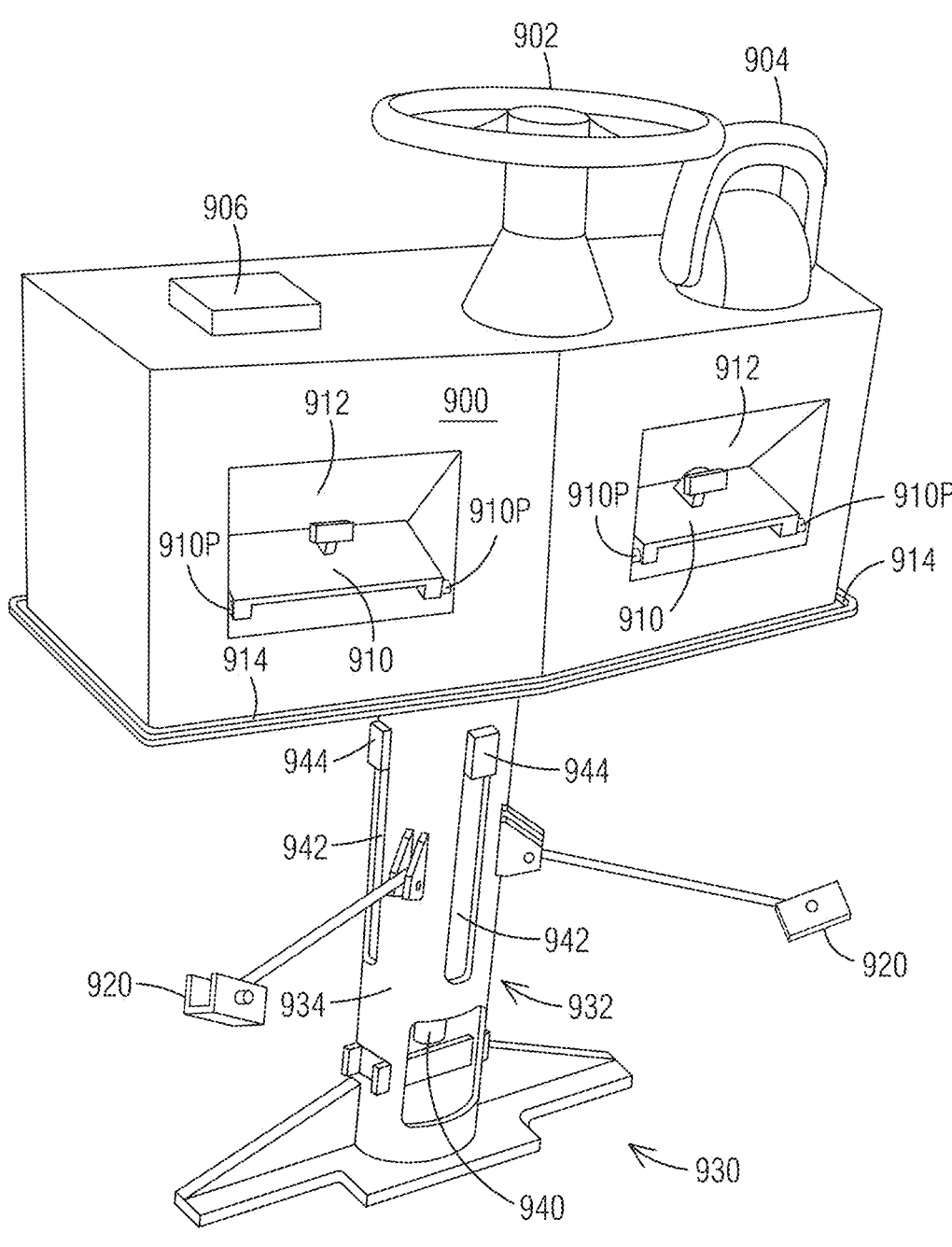
FIG. 11 to FIG. 12 show the example embodiment of the adjustable console panel of FIG. 9 in the upper position.
Figure 12:
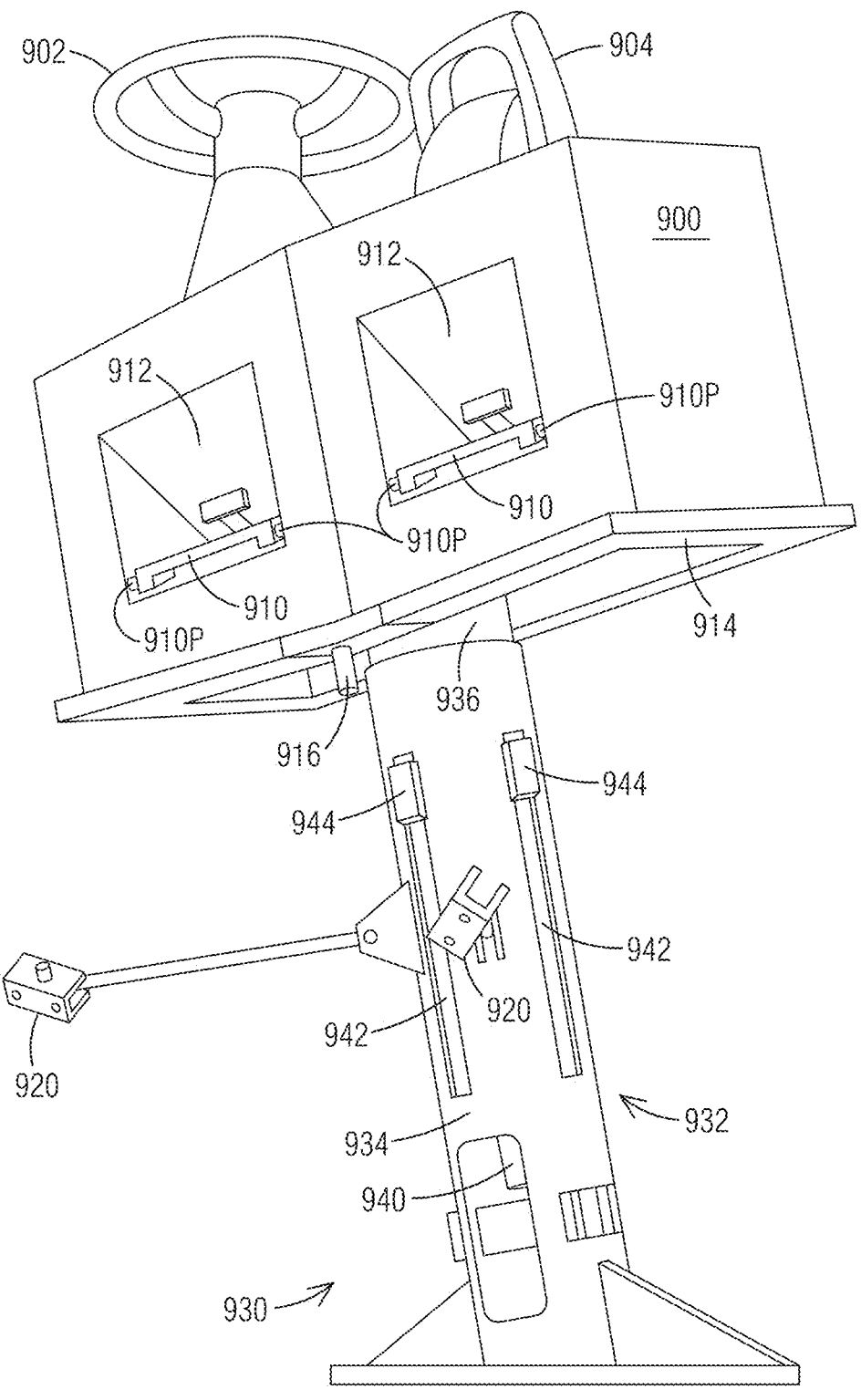

FIG. 9 to FIG. 10 show an alternate example embodiment of the adjustable console panel 900 in the lower position and without the console shell. FIG. 11 to FIG. 12 show the example embodiment of the adjustable console panel 900 of FIG. 9 in the upper position. This example embodiment, the helm control 902, the throttle controls 904, and a control panel 906 (e.g., an engine display) are secured to the adjustable console panel 900. Individual footrests 910 are disposed in respective footrest wells 912. The footrests 910 are shown flipped into the footwells 912, but can be flipped out about footrest pins 910P so they extend outward from the footwells 912.

A U-shaped gutter 914 is secured to the lower end of the adjustable console panel 900 and is configured to catch any water that makes its way down the sides of the adjustable console panel 900. The gutter 914 leads to a drain 916 at a low point. A drain hose (not shown) can be secured to the drain 916 to direct the water to a suitable location. Brackets 920 may be present to help secure the console shell to the adjustable console panel 900.

In this example embodiment, there is an actuator 930 that is secured to and adjusts a position of the adjustable console panel 900. In an example embodiment, the actuator 930 is also secured to a deck of the boat. In this example embodiment, the actuator 930 includes a telescoping assembly 932 secured to the adjustable console panel 900. The telescoping assembly 932 includes two or more telescope members 934, 936 longitudinally moveable relative to one another for moving the adjustable console panel 900 between the lower position and the upper position. The telescoping assembly 932 further includes a motive component 940 (such as a piston, a motor, or the like) to effect the relative longitudinal movement of the telescope members 934, 936. The motive component 940 in this example embodiment is a threaded rod actuator, but any suitable actuator known to the artisan can be used.

In this example embodiment, a guideway 942 in the telescoping member 934 guides a block 944 that moves with the telescoping member 936. The block 944 may contact an upper position sensor when the adjustable console panel 900 is in the upper position to inform a controller of the location of the adjustable console panel 900 or to otherwise indicate the upward motion should stop.

The boat station disclosed herein provides a significant improvement in versatility for boat captains seeking to operate the boat from a variety of positions. This, in turn, represents an improvement in the art.

While various embodiments of the present invention have been shown and described herein, it will be obvious that such embodiments are provided by way of example only. Numerous variations, swapping of features among embodiments, changes, and substitutions may be made without departing from the invention herein. Accordingly, it is intended that the invention be limited only by the spirit and scope of the appended claims.

The invention claimed is:
1. A boat station, comprising:
a console shell configured to be secured to a boat;

a console panel comprising a helm control and a throttle control and configured to move relative to the console shell; and
a position adjusting assembly comprising an adjustable extension component that is secured to the console panel;
wherein the boat station is configured to adjust a vertical position of the console panel, the helm control, and the throttle control by telescoping the adjustable extension component into and out of a panel opening in the console shell along a vertical and rearward direction of travel.

2. The boat station of claim 1,
wherein the adjustable extension component telescopes into and out of the console shell along a linear axis of travel.

3. The boat station of claim 2, wherein the adjustable extension component spans an entire perimeter of the panel opening in the console shell through which the adjustable extension component passes thereby forming a safety skirt that blocks operator access into the panel opening.

4. The boat station of claim 1, wherein the position adjusting assembly further comprises a footrest surface below the console panel that is configured to move with the console panel and to provide a footrest when the console panel is in a console panel upper position.

5. The boat station of claim 4, wherein in the console panel upper position the footrest surface aligns with a surface of the console shell to collectively form the footrest.

6. The boat station of claim 1, further comprising the helm control and the throttle control.

7. A boat station, comprising:
a console shell configured to be secured to a boat;
a helm seat that is vertically adjustable from a helm seat lower position to a helm seat upper position; and
a console panel comprising a helm control and a throttle control thereon and which is vertically adjustable from a console panel lower position to a console panel upper position, wherein a console panel height difference between the console panel lower position and the console panel upper position is greater than a helm seat height difference between the helm seat lower position and the helm seat upper position.

8. The boat station of claim 7, wherein the console panel height difference is at least twenty-four (24) inches.

9. The boat station of claim 7, wherein the console panel height difference is at least eight (8) inches greater than the helm seat height difference.

10. The boat station of claim 7, wherein the boat station is configured such that when the helm seat is in the helm seat lower position and the console panel is in the console panel lower position, the console panel is lower relative to the helm seat than when the helm seat is in the helm seat upper position and the console panel is in the console panel upper position.

11. The boat station of claim 7, wherein the console panel moves along a direction of travel that forms an angle of up to twenty (20) degrees from vertical and is effective to move the console panel closer to the helm seat as the console panel is raised.

12. The boat station of claim 7, further comprising a position adjusting assembly secured to the console panel.

13. The boat station of claim 12, wherein the position adjusting assembly comprises an adjustable extension component secured to the console panel and configured to adjustably extend from the console shell.

14. The boat station of claim 13, wherein the adjustable extension component spans an entire perimeter of a panel opening in the console shell through which the adjustable extension component passes thereby forming a safety skirt that blocks operator access into the panel opening.

15. The boat station of claim 12, wherein the position adjusting assembly further comprises a footrest surface below the console panel that is configured to move with the console panel and to provide a footrest for an occupant in the helm seat when the console panel is in the console panel upper position and when the helm seat is in the helm seat upper position.

16. A center console boat comprising the boat station of claim 7.

17. A boat station, comprising:
a console shell configured to be secured to a boat;
a helm seat vertically adjustable from a helm seat lower position to a helm seat upper position; and
a console panel configured to receive a helm control and a throttle control thereon and which is vertically adjustable at least twelve (12) inches from a console panel lower position to a console panel upper position;

wherein the console panel moves along a direction of travel that forms an angle from vertical that is effective to move the console panel closer to the helm seat as the console panel is raised.

18. The boat station of claim 17, wherein the console panel is vertically adjustable at least eighteen (18) inches.

19. A boat station, comprising:
a console shell configured to be secured to a boat;
a console panel comprising a helm control and a throttle control and configured to move relative to the console shell; and
a position adjusting assembly secured to the console panel and comprising an adjustable extension component secured to the console panel and configured to adjustably extend the console panel from the console shell;
wherein the adjustable extension component spans an entire perimeter of a panel opening in the console shell through which the adjustable extension component passes thereby forming a safety skirt that blocks operator access into the panel opening.

* * * * *